S. O. KLEFSAAS.
TRIP HOOK.
APPLICATION FILED MAR. 28, 1912. RENEWED NOV. 20, 1912.
1,055,281.
Patented Mar. 4, 1913.
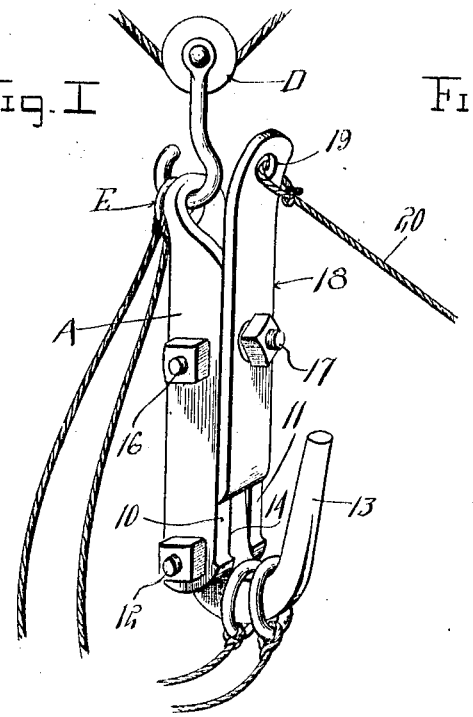
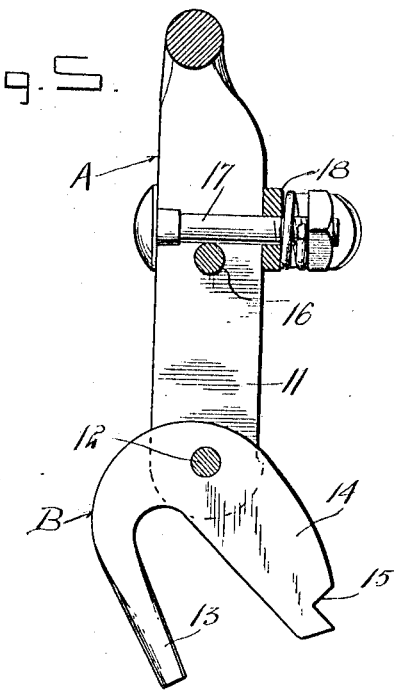
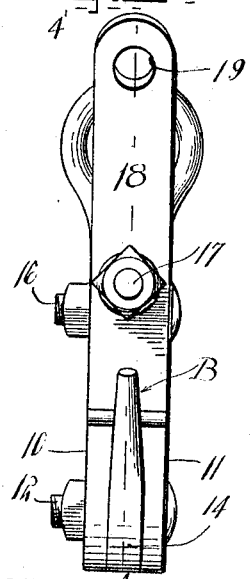
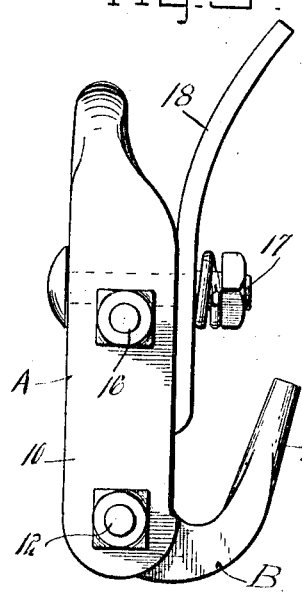
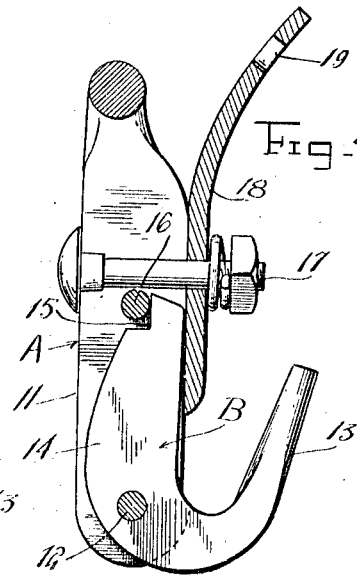
Inventor
S. O. Klefsaas
Attorneys

UNITED STATES PATENT OFFICE.

SIVERT O. KLEFSAAS, OF MADISON, MINNESOTA.

TRIP-HOOK.

1,055,281.  Specification of Letters Patent.   Patented Mar. 4, 1913.

Application filed March 28, 1912, Serial No. 686,796. Renewed November 20, 1912. Serial No. 732,601.

*To all whom it may concern:*

Be it known that I, SIVERT O. KLEFSAAS, a citizen of the United States, residing at Madison, in the county of Lac qui Parle, State of Minnesota, have invented certain new and useful Improvements in Trip-Hooks; and I do hereby declare the following to be a full, clear, and exact description of the invention, such as will enable others skilled in the art to which it appertains to make and use the same.

This invention relates to trip hooks, and particularly to that type employed in the construction of hay slings.

The object of the invention resides in the provision of a trip hook which will efficiently secure the slug ropes around the load to permit of the desired hoisting of the latter and which may be easily tripped to effect the release of the supporting ropes of the sling so as to deposit the load.

With the above and other objects in view, the invention consists in the details of construction and in the arrangement and combination of parts to be hereinafter more fully described and particularly pointed out in the appended claims.

In describing the invention in detail, reference will be had to the accompanying drawings wherein like characters of reference denote corresponding parts in the several views, and in which—

Figure 1 is a perspective view showing the invention applied to a hay sling with those parts of the sling not intimately associated with the hook omitted, Fig. 2, a front elevation of the hook, Fig. 3, a side elevation of the hook, Fig. 4, a section on the line 4—4 of Fig. 2, and Fig. 5, a view similar to Fig. 4 with the pivoted hook member released.

Referring to the drawings, the trip hook is shown as comprising a U-shaped body portion A having spaced arms 10 and 11, said arms being contracted a short distance from their inner ends. Pivoted between the arms 10 and 11 at the outer end of the latter by means of a bolt 12 passing through said arms is a hook member B which includes a bill 13 and a shank 14 provided at its outer end with a cutaway portion 15 for a purpose that will be presently referred to. Passing through the arms 10 and 11 at a point remote from their outer ends is a bolt 16 which is adapted to engage the outer end of the shank 14 when the latter has been moved so as to be disposed entirely between the arms 10 and 11, the cutaway portion 15 serving to permit the outer end of the shank 14 to move a sufficient distance to dispose same entirely between the arms 10 and 11 before said shank is engaged by the bolt 16. Disposed between the arms 10 and 11 above the bolt 16 is a bolt 17 upon which is pivoted a latch 18 having an opening 19 in one end thereof for the connection of a pull cable 20. The end of the latch 18 remote from the opening 19 is adapted when disposed in the same general direction as the arms 10 and 11 to span the space between said arms so as to confine the shank 14 in the position shown in Fig. 2. However, when the latch 18 is moved to a position substantially at right angles to the arms 10 and 11 the shank 14 is free to move to the position shown in Fig. 5 and as said shank is considerably heavier than the bill 13 and as the preponderance of its weight is forward of the bolt 12 the hook member will move to the position shown in Fig. 5 under the influence of gravity as soon as the shank 14 is released by the latch 18.

In the use of the device in connection with the hay sling the body A is engaged with the sling pulley D as is likewise the intermediate ring of the sling rope E. This rope is then passed around the load and the terminal rings thereof are engaged over the bill 13 of the hook member B. The load can then be elevated in the usual manner. When it is desired to deposit the load it is only necessary to swing the latch 18 to a position at right angles to the arms 10 and 11 through the instrumentality of the pull cable 20. The hook member B will then swing to the position shown in Fig. 5 which will effect the disengagement of the terminal rings of the sling rope E therefrom and the load will then be free to fall under the influence of gravity.

What is claimed is:

1. A trip hook comprising a U-shaped body portion, a hook member pivoted between the arms of said body and including a bill and shank, a stop carried by the body adapted to engage the shank of the hook member to limit the movement of the latter in one direction and a latch pivotally mounted on the body for movement across the front edges of the arms of said body and adapted in one position to confine the shank of the hook member between same and said stock and to release said shank when moved to a position substantially at right angles to the arms of the body.

2. A trip hook comprising a U-shaped body portion, a hook member pivoted between the arms of said body and including a bill and shank, a stop carried by the body adapted to engage the shank of the hook member to limit the movement of the latter between the arms of the body in one direction, a bolt confined between the arms of the body and a latch pivoted on the bolt for movement across the front edges of the arms of said body said latch being adapted in one position to confine the shank of the hook member between same and said stop and to release said shank when moved to a position substantially at right angles to the arms of the body.

In testimony whereof, I affix my signature, in presence of two witnesses.

SIVERT O. KLEFSAAS.

Witnesses:
OBERT R. NELSON,
H. L. SORKNES.

Copies of this patent may be obtained for five cents each, by addressing the "Commissioner of Patents, Washington, D. C."